US012783904B2

(12) United States Patent
Shen et al.

(10) Patent No.: US 12,783,904 B2
(45) Date of Patent: Nov. 3, 2026

(54) FINE-TUNING STRATEGY FOR FEW SHOT LEARNING

(71) Applicant: CARNEGIE MELLON UNIVERSITY, Pittsburgh, PA (US)

(72) Inventors: Zhiqiang Shen, Pittsburgh, PA (US); Zechun Liu, Pittsburgh, PA (US); Marios Savvides, Wexford, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 364 days.

(21) Appl. No.: 18/009,860

(22) PCT Filed: Jan. 24, 2022

(86) PCT No.: PCT/US2022/013495

§ 371 (c)(1),
(2) Date: Dec. 12, 2022

(87) PCT Pub. No.: WO2022/169625

PCT Pub. Date: Aug. 11, 2022

(65) Prior Publication Data

US 2023/0368038 A1 Nov. 16, 2023

Related U.S. Application Data

(60) Provisional application No. 63/146,274, filed on Feb. 5, 2021.

(51) Int. Cl.

| | |
|---|---|
| ***G06N 3/126*** | (2023.01) |
| ***G06V 10/776*** | (2022.01) |
| ***G06V 10/82*** | (2022.01) |

(52) U.S. Cl.
CPC .......... *G06N 3/126* (2013.01); *G06V 10/776* (2022.01); *G06V 10/82* (2022.01)

(58) Field of Classification Search
CPC ...... G06N 3/126; G06N 3/086; G06V 10/776; G06V 10/82
See application file for complete search history.

(56) References Cited

U.S. PATENT DOCUMENTS

| | | | |
|---|---|---|---|
| 2020/0252600 | A1 | 8/2020 | Tseng |
| 2020/0364499 | A1 | 11/2020 | Bagherinezhad |

OTHER PUBLICATIONS

Vrbancic et al., "Transfer Learning With Adaptive Fine-Tuning", Oct. 28, 2020, IEEE Access, 8, pp. 196197-196211 (Year: 2020).*
Chen et al., "A Closer Look at Few-Shot Classification", Jan. 12, 2022, ICLR 2019, p. 1-17 (Year: 2020).*

(Continued)

*Primary Examiner* — Kakali Chaki
(74) *Attorney, Agent, or Firm* — KDW FIRM PLLC

(57) ABSTRACT

Disclosed herein is a method providing a flexible way to transfer knowledge from base to novel classes in a few shot learning scenario. The invention introduces a partial transfer paradigm for the few-shot classification task in which a model is first trained on the base classes. Then, instead of transferring the learned representation by freezing the whole backbone network, an efficient evolutionary search method is used to automatically determine which layer or layers need to be frozen and which will be fine-tuned on the support set of the novel class.

8 Claims, 4 Drawing Sheets

(A) Train the feature extractor
(B) Evolutionary search for fine tuning configuration
(C) Classification with searched feature extractor

(56) References Cited

OTHER PUBLICATIONS

Yunhui Guo et al., "SpotTune: Transfer Learning Through Adaptive Fine-Tuning" Proceedings of the IEEE/CVF Conference on Computer Vision and Pattern Recognition (CVPR), 2019, pp. 4805-4814.

Shen et al., "Partial Is Better Than All: Revisiting Fine-tuning Strategy for Few-shot Learning" The Thirty-Fifth AAAI Conference on Artificial Intelligence (AAAI-21)—2021.

International Search Report and Written Opinion for the International Patent Application No. PCT/US2022/13495, mailed May 16, 2022, 5 pages.

* cited by examiner

Algorithm 1 evolutionary algorithm for searching the best fine-tuning configuration.

Input: trained feature extractor: $N$, layer index in a network: $l$, the meat-validation loss: $\mathcal{L}$, number of random sampling operation: $R$, number of *Mutation: M*, number of *Crossover*. $C$, max number of iterations: $I$.

Output: optimized fine-tuning configuration $v^*$

```
define miniEval(v):
    N_l = load(N) #Inherit the weights from the feature extractor trained on the base dataset.
    Set grad_l = 0 if v_i[l] = 0 #set the gradient to 0 according to the scheme vector.
    {v_i, accuracy} = miniFinetune(N_l) # Fine-tune the trageting layers.
    return {v_i, accuracy}
for i = 0: R do
    v_i = RandomChoice ([0, m],L) # Randomly sample fine-tuning schemes, i.e., chose lr for each layer.
    {v_i, accuracy} = MiniEval(v_i) # Evaluate accuracy on the validation dataset.
end for
v_topk = TopK({V, accuracy}) #Initialize the population with TopK vectors. V is the set of {v_i}.
for j = 0: I do
    for i = 0: M do
        v_i = Mutation (v_topK, L) #Generate the off-spring fine-tuning vectors based on the top ones
        {v_i, accuracy} = minieval(v_i) #Evaluate off-springs' accuracy on the validation dataset.
    end for
    for i = 0: C do
        v_i = Crossover (N_topK1, N_topK2) #Generate the crossover vectors between two parents.
        {v_i, accuracy} = minieval(v_i) #Evaluate off-springs' accuracy on the validation dataset.
    end for
    v_topK=TopK ({V, accuracy}) #Update the population by choosing the TopK vectors.
end for
v*, acc*= Top1({V, accuracy}) # Select the best scheme vector with highest validation accuracy.
return v*;
```

FIG. 4

FINE-TUNING STRATEGY FOR FEW SHOT LEARNING

RELATED APPLICATIONS

This application is a national phase filing under 35 U.S.C. § 371 claiming the benefit of and priority to International Patent Application No. PCT/US22/13495, filed Jan. 24, 2022, entitled "IMPROVED FINE-TUNING STRATEGY FOR FEW SHOT LEARNING", which claims the benefit of U.S. Provisional Patent Application No. 63/146,274, filed Feb. 5, 2021, the contents of which are incorporated herein in its entirety.

BACKGROUND

Deep neural networks have enormous potential for understanding natural images. The learning ability of deep neural networks increases significantly with more labeled training data. However, annotating such data is expensive, time-consuming and laborious. Furthermore, some classes (e.g., in medical images) are naturally rare and hard to collect. The conventional training approaches for deep neural networks often fail to obtain good performance when the training data is insufficient. Considering that humans can easily learn from very few examples and even generalize to many different new images, it would be greatly helpful if the network can also learn to generalize to new classes with only a few labeled samples from unseen classes.

Known methods for few-shot learning can generally fall into one of two categories. One is the meta-based method that models the few-shot learning process with samples belonging to the base classes and optimize the model for the target novel classes. The other is the plain solution (non-meta-based, also known as the baseline method) that trains a feature extractor from abundant base class then directly predicts the weights of the classifier for the novel ones.

As the number of images in the support set of novel classes are extremely limited, directly training models from scratch on the support set is unstable and tends to be overfitting. Even utilizing the pre-trained parameters on base classes and fine-tuning all layers on the support set leads to poor performance due to the small proportion of target training data.

A common practice utilized by either meta-based or simple baseline methods relies heavily on the pre-trained knowledge with the sufficient base classes, and then transfers the representation by freezing the backbone parameters and solely fine-tuning the last fully-connected layer or directly extracting features for distance computation on the support data, to prevent overfitting and improve generalization. However, as the base classes have no overlap with the novel ones, meaning that the representation and distribution required to recognize images are quite different between them, completely freezing the backbone network and simply transferring the whole knowledge will suffer from this discrepant domain issue.

SUMMARY

Disclosed herein is a method which utilizes a flexible way to transfer knowledge from base to novel classes. The invention introduces a partial transfer paradigm for the few-shot classification task, shown schematically in FIG. 1. In the disclosed framework, a model is first pre-trained on the base classes, as in prior-art methods. Then, instead of transferring the learned representation by freezing the whole backbone network, an efficient evolutionary search method is used to automatically determine which layer or layers need to be frozen and which will be fine-tuned on the support set of the novel class.

During searching, the validation data will be commandeered as the ground-truth to monitor the performance of the search strategy. This strategy can achieve a better trade-off of using knowledge from base and support data than previous approaches while avoiding incorporating biased or harmful knowledge from base classes into novel classes. Moreover, the disclosed method is orthogonal to meta-learning or non-meta-based solutions, and thus can be seamlessly integrated with them.

FIG. 1 is an illustration of the conventional procedure of pre-training and fine-tuning for few-shot learning. ① represents the standard transfer learning procedure which uses the pre-trained model as a feature extractor and the parameters are fixed during fine-tuning. ② is the disclosed partial transfer strategy of the invention which can fine-tune the model trained on base data with the few novel class data. Fine-tuning with different learning rates on different layers can optimize the feature extractor to better fit the novel class and prevent the model from over-fitting on it, because the novel data has limited samples.

The novel aspects of the invention can be summarized as follows: First, disclosed herein is Partial Transfer (P-Transfer) for the few-shot classification, a framework that enables the searching of transfer strategies on backbone for flexible fine-tuning. The conventional fixed transferring is a special case of the disclosed strategy when all layers are frozen. Second, disclosed herein is a layer-wise search space for fine-tuning from base classes to novel, which helps the searched transfer strategy obtain inspiring accuracies under limited searching complexity.

BRIEF DESCRIPTION OF THE DRAWINGS

By way of example, a specific exemplary embodiment of the disclosed system and method will now be described, with reference to the accompanying drawings, in which:

FIG. 4 shows a meta language description of an evolutionary algorithm for searching for the best fine-tuning configuration.

DETAILED DESCRIPTION

Figure 1:
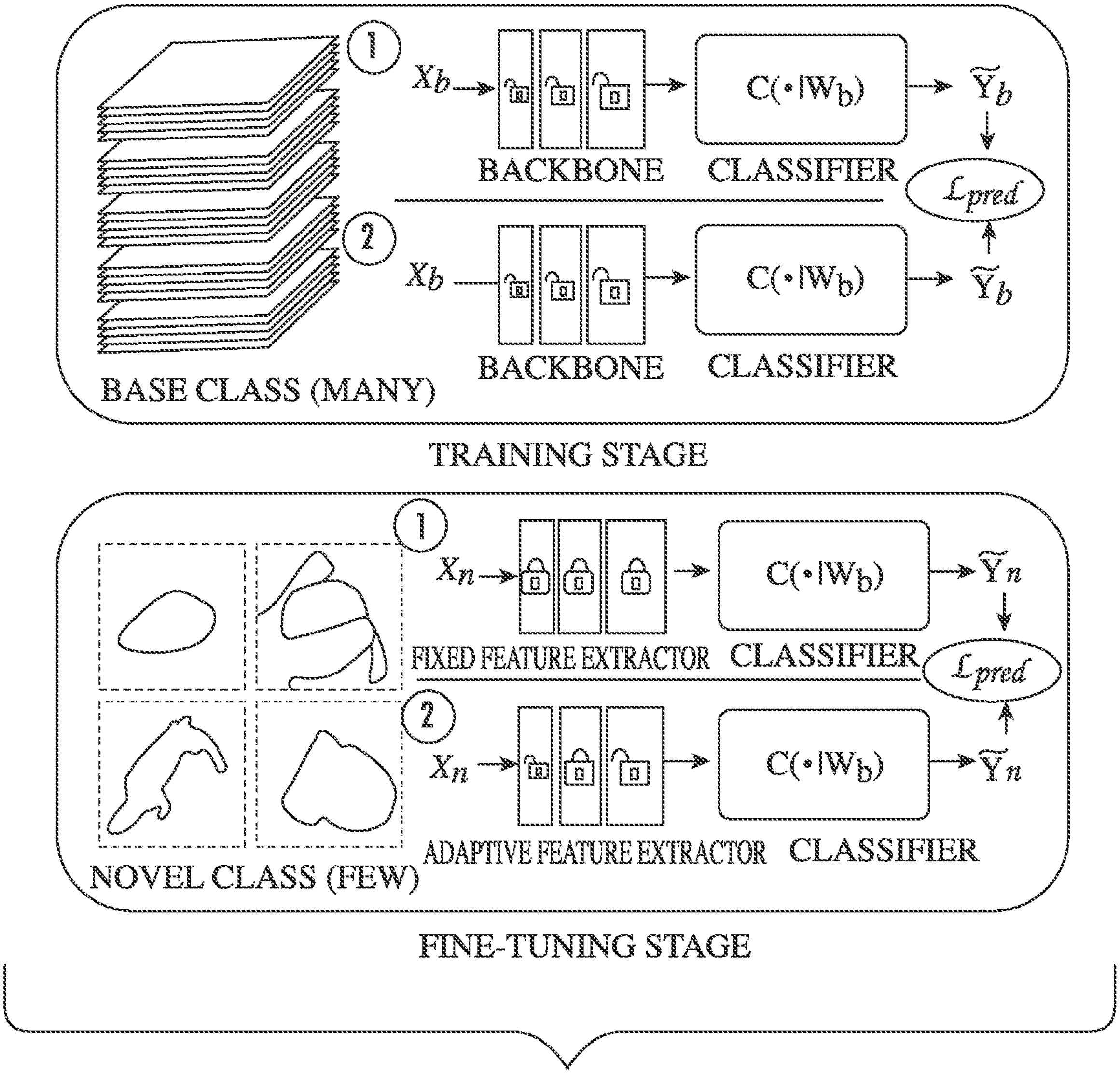
FIG. 1 is a block diagram showing the prior art few-shot learning method contrasted with the method of the present invention.
Figure 2:
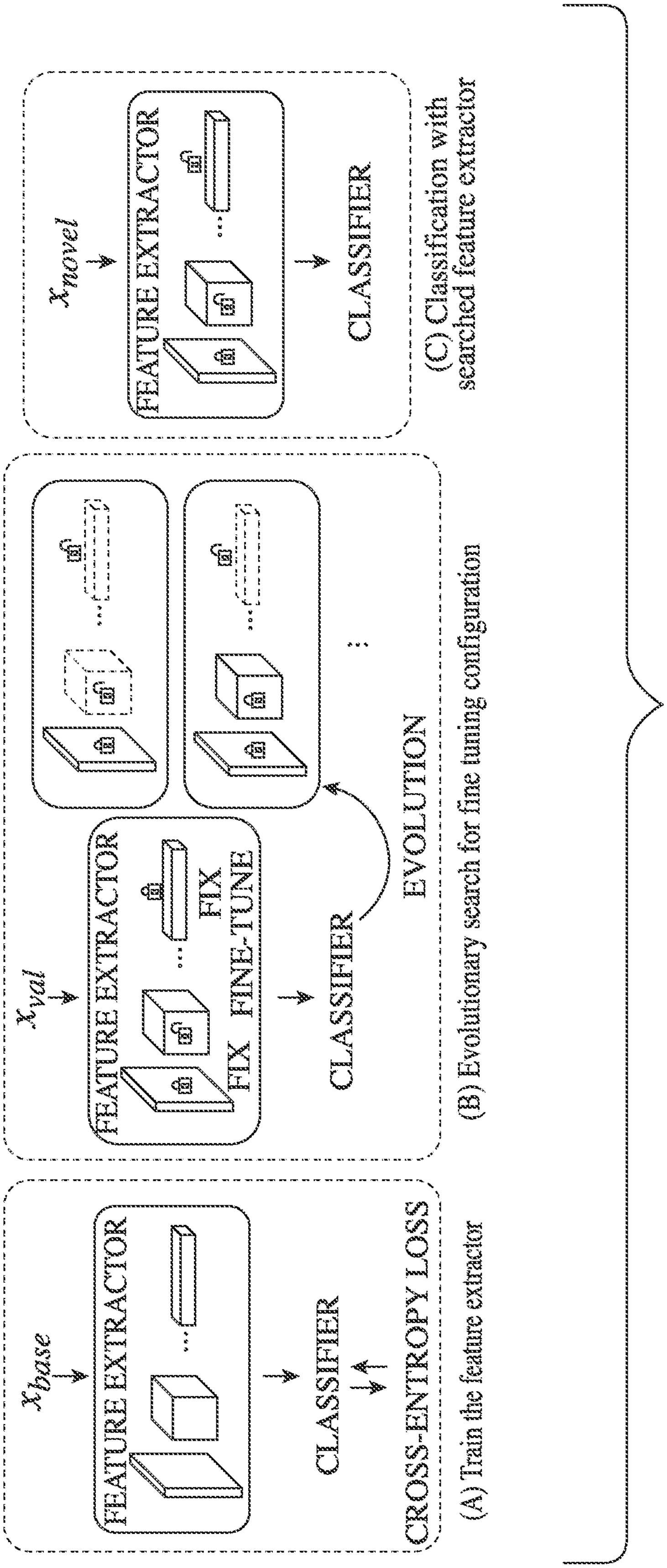
FIG. 2 is a block diagram showing the overall framework of the present invention comprising three steps.

The method, referred to herein as P-Transfer, for partial few shot learning will now be disclosed with reference to FIG. 2. The method comprises three main steps: 1) train a base model on base class samples, as shown in FIG. 2(*a*); 2) apply evolutionary search to explore optimal transfer strategy based on an accuracy metric, as shown in FIG. 2(*b*) wherein the curved arrow indicates looping; and 3) transfer base model to novel class with the searched strategy through partial fine-tuning, as shown in FIG. 2(*c*).

In the few-shot classification task, given abundant labeled images $X_b$ in base classes $L_b$ and a small proportion of labeled images $X_n$ in novel classes $L_n$, wherein $L_b \cap L_n = 0$, the goal is to train models for recognizing novel classes with the labeled large amount of base data and limited novel data. Considering an N-way K-shot few-shot task, where the support set on novel classes has N classes with K labeled images and the query set contains the same N classes with Q unlabeled images in each class, the few-shot classification algorithms are required to learn classifiers for recognizing the N×Q images in the query set of N classes.

The objective of P-Transfer is to discover the best transfer learning scheme $$V_{lr}^*,$$

thieves maximal accuracy when fine-tuning under that scheme:

$$V_{lr}^* = \operatorname{argmax} \mathcal{A}_{cc}(W, V_{lr}) \quad (1)$$

where:

$V_{lr}=[V_1, V_2, \ldots, V_L]$ defines the layer-wise learning rate for fine-tuning the feature extractor;

W are the network's parameters; and

L is the total number of layers.

As shown in FIG. 2, the disclosed method consists of three steps: base class pre-training, evolutionary search, and partial transfer based on the searched strategy.

Step 1: Base Class Pre-Training—Base class pre-training is the fundamental step of the pipeline. As shown in FIG. 2(*a*), for the simple baseline, the common practice to train the model from scratch by minimizing a standard cross-entropy objective with the training samples in base classes is followed. For the meta-learning pipeline, the meta-pretraining also follows the conventional strategy that a meta-learning classifier is conditioned on the base support set. More specifically, in the meta-pretraining stage, the support set and the query set on the base class are first sampled randomly from N classes, and the parameters are then trained to minimize the N-way prediction loss.

Figure 3:
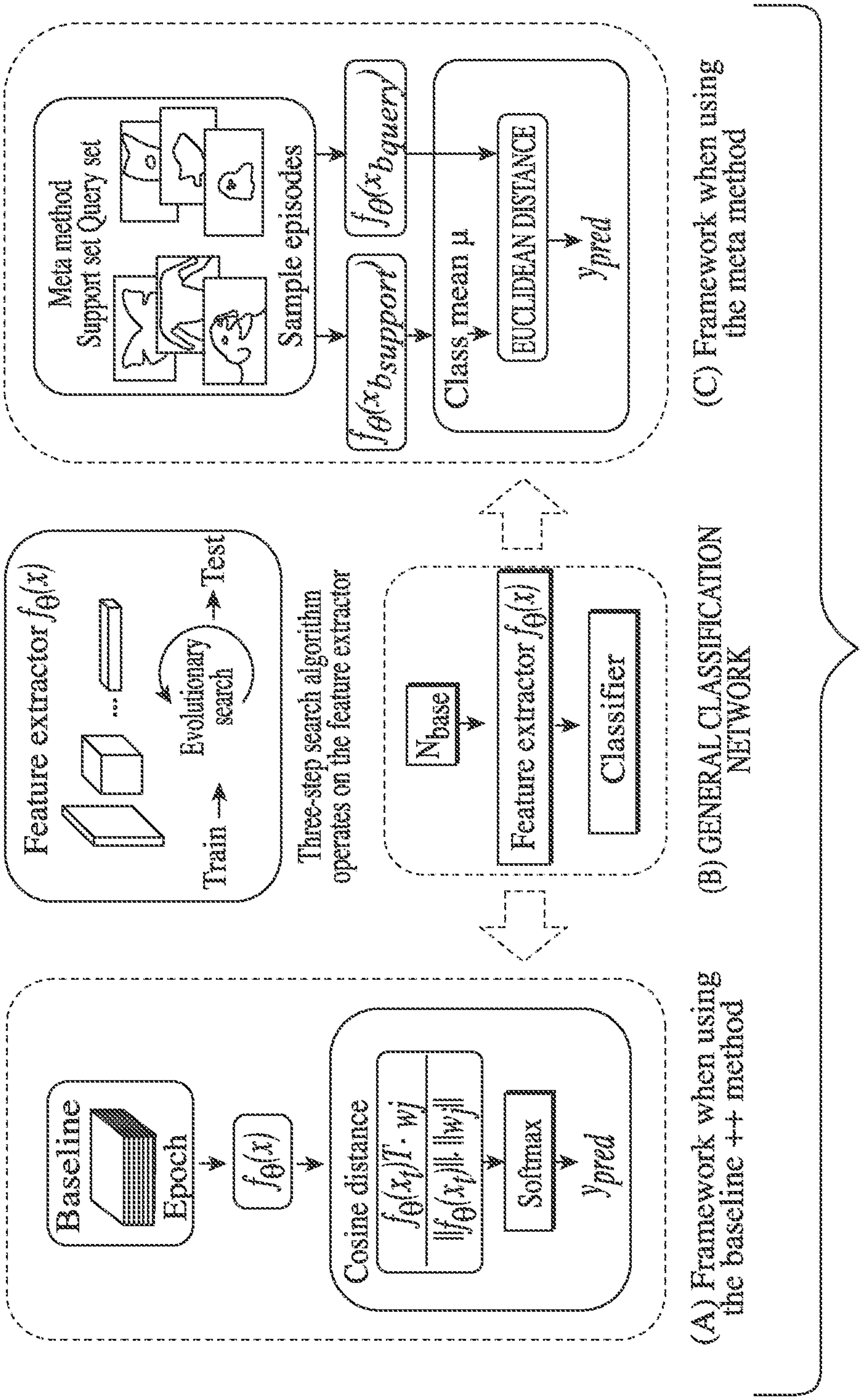
FIG. 3 is a block diagram showing how the three-step method of the present invention can be used with Baseline++ and Meta methods of few shot learning.

Step 2: Evolutionary Search. The second step is to perform evolutionary search with different fine-tuning strategies to determine which layers will be fixed and which layers will be fine-tuned in the representation transfer stage. Simple baseline through pre-training+fine-tuning, and meta-based methods are considered. In these two scenarios the evolutionary searching operations are slightly different, as shown in FIG. 2(*b*) and FIG. 3, which shows that the three-step search algorithm disclosed herein operates on the feature extractor $f_\theta(x)$. The general classification framework is shown in FIG. 3(*b*) and can easily be incorporated into the baseline method with cosine distance, denoted as baseline++ and shown on FIG. 3(*a*), as well as the meta-learning based methods, shown in FIG. 3(*c*).

Generally, the method searches the optimal strategy for transferring from base classes to novel classes through fixing or re-activating some particular layers that can help novel classes.

Step 3: Partial Transfer via Searched Strategy—As shown in FIG. 2(*c*), the final step is to apply the disclosed searched transfer strategy to the novel classes. Different from the simple baseline that fixes the backbone and fine-tunes the last linear layer only, or meta-learning methods that use the base network as a feature extractor for the meta-testing, the disclosed strategy partially fine-tunes the base network on the novel support set based on the search strategies for both types of methods. This is also the core component to achieve significant improvement.

The search space is related to the model architecture utilized for the few-shot classification. Generally, it contains the layer-level selection (fine-tuning or freezing) and learning rate assignment for fine-tuning. The search space can be formulated as $m^K$, where m is the number of choices for learning rate values and K is the number of layers in networks. For example, learning rate∈{0, 0, 01, 0.1, 1.0} could be chosen as the learning rate zoo (i.e., m=4) wherein a learning rate of 0 indicates this layer is frozen during fine-tuning. For example, for a Conv6 structure, the search space includes 46 possible transfer strategies. The searching method can automatically match the optimal choice for each layer from the learning rate zoo during fine-tuning. A brief comparison of the search space is shown in Table 1. It increases sharply if deeper networks are chosen.

TABLE 1

| Network | Conv6 | ResNet-12 | ResNet-K |
|---|---|---|---|
| Complexity | $m^6$ | $m^{12}$ | $m^K$ |

The searching step follows the evolutionary algorithm. Evolutionary algorithms (a.k.a genetic algorithms), are based on the natural evolution of creature species. It contains reproduction, crossover (swapping parts of the elements of the learning strategy vectors), and mutation (flipping some elements of the learning strategy vectors) stages. Here, first a population of strategies is embedded to vectors $\mathcal{V}$ and initialized randomly. Each individual $v$ consists of its strategy for fine-tuning. After initialization, each individual strategy $v$ is evaluated to obtain its accuracy on the validation set. Among these evaluated strategies, the top K are selected as parents to produce posterity strategies. The next generation strategies are made by mutation and crossover stages. By repeating this process in iterations, a best fine-tuning strategy with the best validation performance can be discovered. One embodiment of a detailed search pipeline is presented in FIG. 4, showing exemplary Algorithm 1.

As shown in FIG. 3, the search algorithm disclosed herein is incorporated into existing few-shot classification frameworks. The non-meta baseline++ and meta ProtoNet are used as examples.

For Use With Simple Baseline++ Methods—Baseline++ methods aim to explicitly reduce intra-class variation among features by applying cosine distances between the feature and weight vector in the training and fine-tuning stages. As shown in FIG. 3(*a*), the design of distance-based classifier is followed in searching but the backbone feature extractor $f_\theta(x)$ is adjusted through exploring different learning rates for different layers during fine-tuning. Intuitively, the learned backbone and distance-based classifier from the searching method are more harmonious and powerful than freezing backbone network and only fine-tuning weight vectors for few-shot classification, as the whole model is tuned end-to-end.

For Use With Meta-Learning-Based Methods—FIG. 3(*c*) shows the formulation of how to apply the searching method to meta-learning method for few-shot classification. In the meta-training stage, the algorithm first randomly chooses N classes, and samples small base support set $x_{b(s)}$ and a base query set $x_{b(q)}$ from samples within these classes. The objective is to learn a classification model M that minimizes N-way prediction loss of the samples in the query set $Q_b$.

Here, the classifier M is conditioned on the provided support set $x_b$. Similar to baseline++, the classification model M is trained by fine-tuning the backbone network and classifier simultaneously, to discover the optimal fine-tuning strategy. As the predictions from a meta-based classifier are conditioned on the given support set, the meta-learning method can learn to learn from limited labeled data through a collection of episodes.

In few-shot learning, the pre-trained feature extractor is required to provide proper transferability from base classes to one or more novel classes in the meta or non-meta learning stage. The transferring of the learning aims to transfer the common knowledge from base objects to the novel class. However, as discussed, there may be some unnecessary and even harmful information in the base class. Because the novel data is few and sensitive to the feature extractor, the complete transferring strategy will not be able to avoid the unnecessary and harmful information, indicating that method disclosed herein is a better solution for the few-shot scenario.

Usually, the base and novel class are in the same domain, so using the pre-trained feature extractor on base data and then transferring to novel data can obtain good or moderate performance. However, in the cross-domain transfer-learning, more layers need to be fine-tuned to adapt the knowledge for the target domain since the source and target domains are discrepant in content. In this circumstance, the conventional transfer learning is no longer applicable. The disclosed method of partial transferring with diverse learning rates on different layers is competent for this intractable situation, and intuitively, fixed transferring is generally a special case of our strategy and ours has better potential in few-shot learning.

Disclosed herein is a partial transfer (P-Transfer) method for the few-shot classification. The method transfers knowledge from base classes to novel classes through searching strategies in few-shot scenarios without any proxy. The method boosts both the meta and non-meta based methods by a large margin as the flexible transfer/fine-tuning benefits from few support samples to adjust the backbone parameters. Intuitively, the P-transfer method has larger potential for few-shot classification and even for traditional transfer learning.

As would be realized by one of skill in the art, the methods described herein can be implemented by a system comprising a processor and memory, storing software that, when executed by the processor, performs the functions comprising the method.

The invention claimed is:

1. A method for fine tuning a few shot classifier comprising a base network to recognize novel classes based on few shot learning, comprising:

training the base network on one or more base classes;

performing an evolutionary search of possible learning strategies to determine a most accurate learning strategy for fine-tuning, the learning strategies including a selection of layers to be fine-tuned for the novel classes and a selection of a particular learning rate for each of the selected layers, wherein each selected layer corresponds to a different selected learning rate; and partially fine-tuning each selected layer of the base network using a selected particular learning rate of each selected layer for the novel classes based on a most accurate learning strategy determined as a result of the evolutionary search;

wherein the evolutionary search comprises:

embedding a population of possible strategies in randomly initialized vectors wherein the elements of a randomly initialized vector represent learning rates for layers of the base network;

iteratively performing the steps of:

evaluating each strategy to obtain its accuracy on a validation set;

choosing a predetermined number of top-performing strategies; and forming a next generation of posterity strategies by mutation and crossover of the top performing strategies.

2. The method of claim 1 wherein a search space for the evolutionary search comprises m possible learning strategies, wherein: m is the number of choices for learning rate values; and K is the number of layers in the base network.

3. The method of claim 1 wherein a learning rate of 0 in a randomly initialized vector indicates a layer that is frozen during the partial fine-tuning of the base network.

4. The method of claim 1 wherein the few shot classifier uses a baseline++ method comprising a backbone feature extractor and a cosine-distance classifier and further wherein the partial fine-tuning is performed on the backbone feature extractor.

5. The method of claim 1 wherein the few shot classifier uses a meta method comprising a backbone network and a classifier and further wherein the partial fine-tuning is simultaneously performed on the backbone network and the classifier.

6. A system comprising: a processor; memory, storing software that, when executed by the processor, performs the method of claim 1.

7. A system comprising: a processor; memory, storing software that, when executed by the processor, performs the method of claim 5.

8. A system comprising: a processor; memory, storing software that, when executed by the processor, performs the method of claim 4.

* * * * *